US008325663B2

(12) United States Patent
Li et al.

(10) Patent No.: US 8,325,663 B2
(45) Date of Patent: Dec. 4, 2012

(54) SYSTEM, APPARATUS AND METHODS FOR ACCELERATING INITIAL ENTRY IN MULTI-CARRIER WIRELESS DEPLOYMENT

(75) Inventors: Zexian Li, Espoo (FI); Xin Qi, Beijing (CN)

(73) Assignee: Nokia Siemens Networks Oy, Espoo (FI)

( * ) Notice: Subject to any disclaimer, the term of this patent is extended or adjusted under 35 U.S.C. 154(b) by 418 days.

(21) Appl. No.: 12/554,487

(22) Filed: Sep. 4, 2009

(65) Prior Publication Data

US 2010/0056202 A1  Mar. 4, 2010

Related U.S. Application Data

(60) Provisional application No. 61/094,281, filed on Sep. 4, 2008.

(51) Int. Cl.
*H04W 4/00* (2009.01)
(52) U.S. Cl. .................. 370/329; 370/338; 370/341
(58) Field of Classification Search .................. None
See application file for complete search history.

(56) References Cited

U.S. PATENT DOCUMENTS

| | | | | |
|---|---|---|---|---|
| 2009/0257366 | A1* | 10/2009 | Power et al. | 370/280 |
| 2010/0040015 | A1* | 2/2010 | Ernstrom et al. | 370/330 |
| 2010/0061333 | A1* | 3/2010 | Marsh et al. | 370/330 |
| 2010/0298031 | A1* | 11/2010 | Han et al. | 455/561 |
| 2011/0122846 | A1* | 5/2011 | Yu et al. | 370/335 |

OTHER PUBLICATIONS

Hamiti, S, "The Draft IEEE 802.16m System Description Document"; IEEE 802.16m-08/003r4; Jul. 29, 2008; pp. 1-88.

* cited by examiner

*Primary Examiner* — Chi Pham
*Assistant Examiner* — Soon-Dong D Hyun
(74) *Attorney, Agent, or Firm* — Slater & Matsil LLP

(57) ABSTRACT

Systems and methods for providing an efficient network entry for a mobile station in RF communications systems with fully configured and partially configured carriers are described. A distinguishing parameter for fully configured carriers is determined. A mobile station receives a carrier and determines whether a fully configured carrier has been received. The mobile station performs synchronization with a base station using the detected fully configured carrier and completes a network entry procedure. In one method embodiment, the distinguishing parameter is a unique preamble characteristic. In another method embodiment, the fully configured carrier frequency is part of messages broadcast by both the fully configured and partially configured carriers. In yet another method embodiment, the carrier raster for fully configured carriers is distinguishable from the carrier raster for partially configured carriers. Latency is reduced for the network entry process for the mobile stations.

23 Claims, 4 Drawing Sheets

SYSTEM, APPARATUS AND METHODS FOR ACCELERATING INITIAL ENTRY IN MULTI-CARRIER WIRELESS DEPLOYMENT

This application claims the benefit of U.S. Provisional Application No. 61/094,281, filed on Sep. 4, 2008, entitled "System, Apparatus and Methods for Accelerating Initial Entry in Multi-Carrier Wireless Deployment," which application is hereby incorporated herein by reference.

TECHNICAL FIELD

The present invention is directed, in general, to communication systems and, more particularly, to a system and method for providing an accelerated method for the user equipment to enter a multiple carrier wireless network with fully configured and partially configured carrier capability.

BACKGROUND

As wireless communication systems such as cellular telephone, satellite, and microwave communication systems become more widely deployed and continue to attract a growing number of users, there is a pressing need to accommodate a large and variable number of communication subsystems transmitting a growing volume of data with a fixed resource such as a fixed channel bandwidth accommodating a fixed data packet size. Traditional communication system designs employing a fixed resource (e.g., a fixed data rate for each user) have become challenged to provide high, but flexible, data transmission rates in view of the rapidly growing customer base.

Presently, the use of wireless networks (often referred to as "Wi-Fi" and promoted and regulated by the "Wi Fi Alliance", an industry consortium) to provide services that are data intensive, such as laptop or portable wireless email access, internet browsing, video and music downloads, video program transmission to mobile devices, real-time gaming over the internet, voice over internet protocols for voice service ("VoIP") and the like is often provided by wireless LAN access such as internet "hot spots" in cafes, hotels, universities and other public access areas. The compatibility and interoperability of the networks and devices in these systems is covered by various standards. Most existing wireless networks IEEE 802.11a/b/g/n standards, for example, provide wireless networking standards typically used by laptop computers, some personal data assistants (PDAs) and some portable computer devices such as palmtops, notebooks, and multimedia tablets. Advanced cellular phones with mobile internet capability may also use these interfaces. These interfaces are limited in distance and data capacity.

More recently, newer standards are being developed to enhance the range, services and bandwidths available for these internet access applications. The IEEE standard known as IEEE 802.16 covers recent developments in this area. Sometimes this standard is referred to as "Wireless MAN" but also as "WiMAX", an acronym for "Worldwide Interoperability for Microwave Access". The adoption and promotion of this extended wireless broadband access standard for networks is promoted by the WiMAX Forum which maintains a website at www.WiMAX.org.

The WiMAX standard was released and then amended several times to extend functionality, and the development work still continues. IEEE standard 802.16-2004, sometimes called "fixed WiMAX", provided the broad features of the standard, adding distance and capability over 802.11 WiFi systems, but failed to address mobile devices. IEEE standard 802.16e-2005, which is sometimes referred to as "mobile WiMAX", added support for mobile and portable devices including for example, hand-off features.

Comparing WiMAX to WiFi or Wireless LAN, the WiMAX standard provides a wireless interface to replace wired "last mile" interfaces and provide a wireless replacement or substitute for DSL or cable broadband access. The range provided by a WiMAX system may be much larger than for WiFi, for example 10 or more kilometers, and speeds may also exceed that of WiFi. Applications described by the WiMAX forum include providing portable internet connectivity, connecting WiFi hotspots with the Internet, providing metropolitan or corporate connectivity to the internet, and the aforementioned "last mile" broadband connectivity.

The user accessing WiMAX may connect to a base station that can be, for example, as small as a residential satellite TV dish, and larger base stations are also contemplated. As mobile unit support is added to the systems, laptops with PC Cards or USB dongles, cell phones, personal digital assistants ("PDAs"), internet appliances such as portable browsing tablets, MP3 players, game consoles and the like are expected to be the customer equipment that accesses the broadband connections provided by WiMAX.

Current development for WiMAX standards includes an advanced air interface standard being developed referred to as IEEE 802.16m. This standard being developed presently by an industry group known as "Task Group m" will provide extensions to the current WiMAX standards to support data rates of 100 Mbit/s for mobile applications and 1 Gbit/s for fixed applications, cellular, macro and micro cell coverage. A document titled "The Draft IEEE 802.16m System Description Document" (hereinafter the "SDD") and numbered IEEE 802.16m-08/003r4, which is hereby incorporated by reference, describes the system that is proposed to be implemented.

One approach to increasing bandwidth in radio telecommunications is to allocate multiple carriers to carry the payloads. This has been proposed in several existing and developing standards including IMT-A and the third generation long term evolution project 3GPP-LTE. In the 802.16m SDD, the use of multiple radio frequency ("RF") carriers to increase data bandwidth is described. Paragraph 11.6.4 provides that there will be two types of carriers a mobile station ("MS") may receive. A carrier may be a fully configured carrier. A fully configured carrier is a carrier for which all control channels including synchronization, broadcast, multicast and unicast control signaling are configured. A partially configured carrier is defined as a carrier that is provided with essential control channel configuration to support traffic exchanges during multiple carrier operations.

From a MS point of view, these carriers can be divided into two types: primary carriers and secondary carriers. A primary carrier is a fully configured carrier and contains full physical layer and media access control ("PHY/MAC") control information. The primary carrier is responsible for carrying all of the control information needed for proper MS operation. Each MS will have only one primary carrier. A secondary carrier is a partially configured or fully configured carrier the MS may use for traffic, but only per the allocation from the base station ("BS") and per rules provided from the primary carrier. A partially configured supplemental or secondary carrier cannot conduct communications with a mobile station directly.

The SDD does not provide implementation details for a mobile station to efficiently access the fully configured, or primary, and partially configured, or secondary, carriers. A continuing need thus exists for methods and apparatus to efficiently perform the MS access to the primary carrier in the multiple carrier environment, such as is proposed for the advanced air interface of future 802.16 WiMAX systems.

SUMMARY OF THE INVENTION

These and other problems are generally solved or circumvented, and technical advantages are generally achieved, by advantageous embodiments of the present invention in which a communication terminal such as a MS (typically a mobile phone or cell phone) is provided that may implement a user function. Efficient method embodiments are provided to perform network entry of the MS into a multiple carrier RF system by providing a characteristic that distinguishes a fully configured carrier that supports communications over an air interface from partially configured carriers that are not so configured. The MS may then efficiently determine the fully configured carrier and perform synchronization with the BS and enter the network with reduced latency (reduced time required to enter the network).

In a first illustrative embodiment, the preambles of fully configured carriers are grouped together and the preambles of the partially configured carriers are grouped together so that when a MS receives a preamble, it may determine from the preamble received that it is or is not a fully configured carrier. Without loss of generality or otherwise limiting the invention, the numbers of preamble sequences used for fully configured carriers and partially configured carriers are not necessarily the same. As an implementation example, there can be just one preamble sequence defined for all partially configured carriers.

According to another illustrative embodiment, an apparatus such as a MS is provided that may include a receiver for receiving, from a transmitter, a preamble. The preamble is then used to receive a broadcast message that includes information indicating whether the carrier on the received frequency is a fully configured carrier, and if not, further includes information indicating where the associated fully configured carrier is located. The MS can then change to the fully configured carrier frequency without searching further carrier preambles. If the message information associated with the received preamble indicates the carrier is a fully configured carrier, the MS can then proceed to complete the network entry process using that carrier.

According to yet another illustrative embodiment, an apparatus such as a MS is provided that includes a receiver for receiving, from a transmitter, fully configured carriers having a specified carrier raster that is different from a carrier raster used for partially configured carriers. On detecting a carrier with the predetermined raster, the MS has identified a fully configured carrier and may synchronize to the carrier and complete the network entry process.

According to another illustrative embodiment, a software program is provided on a computer readable medium that, when executed by a programmable MS, performs the method of providing a MS network entry process that distinguished a fully configured carrier from partially configured carriers received over an RF interface, identifies a fully configured carrier, synchronizes to the fully configured carrier and communicates with a base station over the fully configured carrier, and completes the network entry process.

An integrated circuit embodiment is provided including at least one RF transceiver, a processor, a memory, and a software program stored within the memory. The program is executed by the processor to perform the network entry for a MS by distinguishing a fully configured carrier received over an RF interface from partially configured carriers received over the RF interface, detects a fully configured carrier received at the RF interface, synchronizes to a BS using the fully configured carrier, and competes a network entry process for the MS.

In another illustrative embodiment, a computer readable medium may be provided with executable instructions that cause a programmable processor to perform a MS network entry into a network having a base station transmitting RF signals over fully configured carriers and partially configured carriers, distinguishing fully configured carriers from partially configured carriers, detecting a received fully configured carrier, synchronizing to the base station using the fully configured carrier, and completing the network entry process.

According to another illustrative method embodiment, an apparatus such as a MS is provided that may include a receiver for receiving, from a transmitter, a preamble and a broadcast message over an air interface that uses 802.16m standard signaling. The broadcast message associated with the received preamble includes information indicating whether the carrier on the received frequency is a fully configured carrier, and if not, further includes information indicating where the associated fully configured carrier is located. After receiving the broadcast message using the received preamble, the MS can then change to the fully configured carrier frequency without searching for further preambles.

According to an illustrative embodiment, an apparatus such as an 802.16m compliant MS (typically a mobile phone or cell phone) is provided that may implement a user function. An efficient method is provided to perform network entry of the MS into a multiple carrier 802.16m standard compliant system by providing a characteristic that distinguishes a fully configured carrier that is fully configured to support communications over an air interface from partially configured carriers that are not so configured. In one illustrative embodiment, the preambles of a fully configured carrier are grouped together and the preambles of the partially configured carriers are grouped together so that when a MS receives a preamble, it may determine from the preamble received that it is or is not a fully configured carrier.

The foregoing has outlined rather broadly the features and technical advantages of the present invention in order that the detailed description of the invention that follows may be better understood. Additional features and advantages of the invention will be described hereinafter which form the subject of the eventual claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the following description.

BRIEF DESCRIPTION OF THE DRAWINGS

For a more complete understanding of the invention, and the advantages thereof, reference is now made to the following descriptions taken in conjunction with the accompanying drawing, in which.

DETAILED DESCRIPTION

Exemplary embodiments are described herein by using as illustrative examples a wireless system using an advanced air interface described by the IEEE 802.16m air interface standard. However, the methods and apparatuses provided herein may be advantageously applied to other RF communication interfaces where multiple carriers for adding bandwidth are used with fully configured and partially configured carriers. The examples provided herein are presented for the purpose of explaining the operation of the various embodiments but are only examples, and do not limit the scope of the invention or the scope of the eventual claims.

Figure 1:
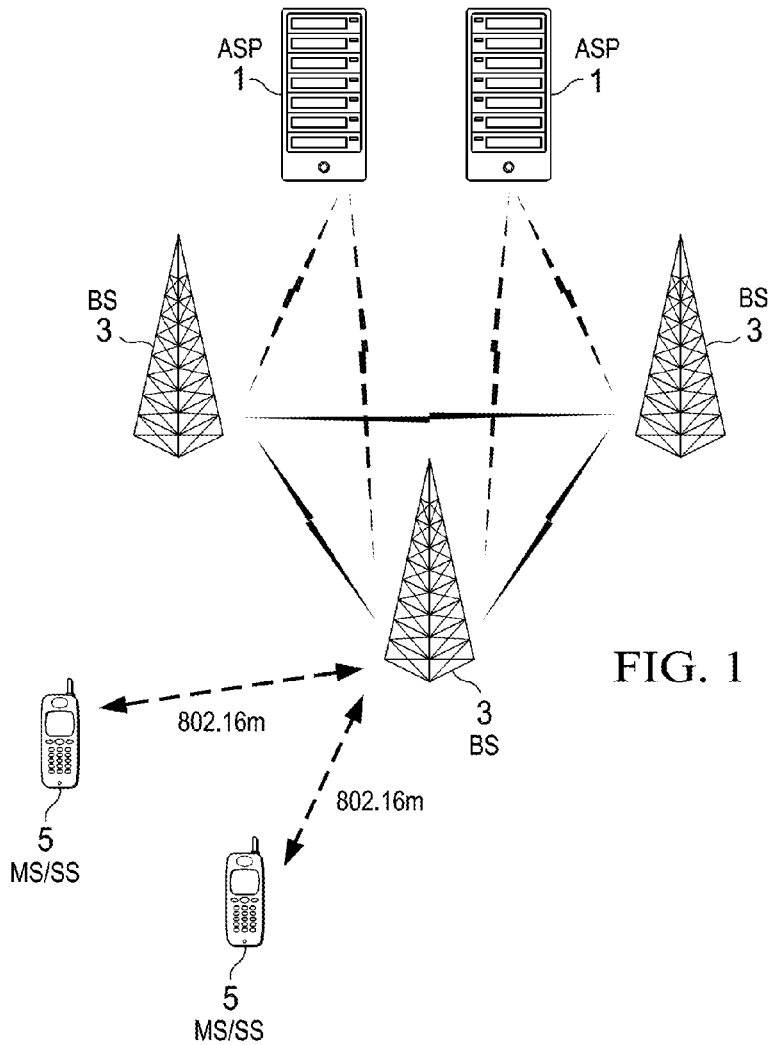
FIG. 1 illustrates a pair of subscriber stations operating in a system using for example, an 802.16m air interface.

Referring initially to FIG. 1, illustrated is a system level diagram of a radio frequency interface communication system including a wireless or air interface communication system using, as an illustrative example, the 802.16m standard air interface that provides an environment for the application of the principles of the present invention.

The base stations 3 communicate to mobile stations or subscriber stations 5 (MS/SS) over the RF air interface as defined in the IEEE 802.16m standard. The base stations 3 are also networked and may communicate one to another over wireless or wired connections. The base stations 3 also communicate to an application services provider (ASP) 1, which may be considered as the "internet" for simplicity, it is the network and hardware that provides access to the internet.

The base stations 3 may host functions such as radio resource management (e.g., internet protocol ("IP"), header compression and encryption of user data streams, ciphering of user data streams, radio bearer control, radio admission control, connection mobility control, and dynamic allocation of resources to user equipment in both the uplink and the downlink), scheduling and transmission of paging messages, scheduling and transmission of broadcast information, and measurement and reporting configuration for mobility and scheduling, and network discovery and selection of the subscriber. The ASP 1 may host functions such as distribution of paging messages to the base stations, security control, terminating user plane ("U-plane") packets for paging reasons, switching of U-plane for support of the user equipment mobility, idle state mobility control, and system architecture evolution bearer control. The mobile stations or subscriber stations 5 receive broadcast messages, control messages and an allocation of a group of information blocks from the base stations.

The IEEE 802.16m SDD contemplates the use of multiple carriers to provide added bandwidth. The carriers may have a bandwidth of, as presently proposed, up to 20 MHz. This bandwidth is not sufficient for data intensive applications such as audio and video downloads, internet browsing, mobile television and the like.

The use of multiple carriers to increase the bandwidth available to a subscriber is contemplated by the SDD. The methods of the present invention describe advantageous methods for providing efficient network entry of a mobile station in a multiple carrier network.

Figure 2:
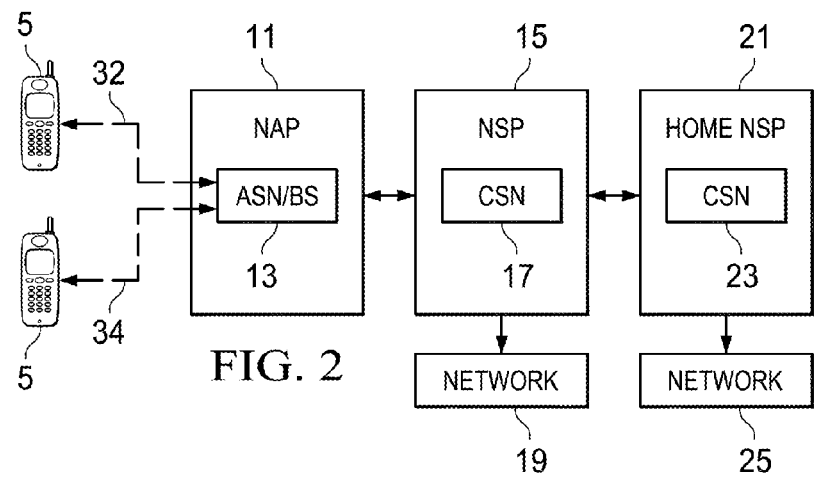
FIG. 2 illustrates in a simplified system diagram the architecture of a typical 802.16 system.

FIG. 2 illustrates connectivity between the mobile stations 5 and the other communications entities as part of a system architecture specifically using the WiMAX terminology. Air interface links 32 and 34 are, for example, 802.16m standard advanced air interfaces coupled between the mobile stations and the Access Services Network ("ASN") 13, which includes the base station BS. ASN 13 is part of a Network Access Provider ("NAP) 11. NAP 11 is coupled, by some interface such as a wired or wireless interface, to a Network Service Provider ("NSP) 15, which includes a Connectivity Service Network ("CSN") 17 and is coupled to an internet or network port 19. The NSP 15 may not be the NSP that the subscriber is associated with, so a further connection may be made to the subscribers home NSP 21, which likewise includes a CSN 23 and is connected to a network connection 25. Each of these entities may be designed in various configurations, as part of or integrated with another entity, and large and small scales are envisioned. For example, the base station BS may be a femto, pico, macro or mini base station serving a single home, an office building, a college campus or a metropolitan area.

Figure 3:
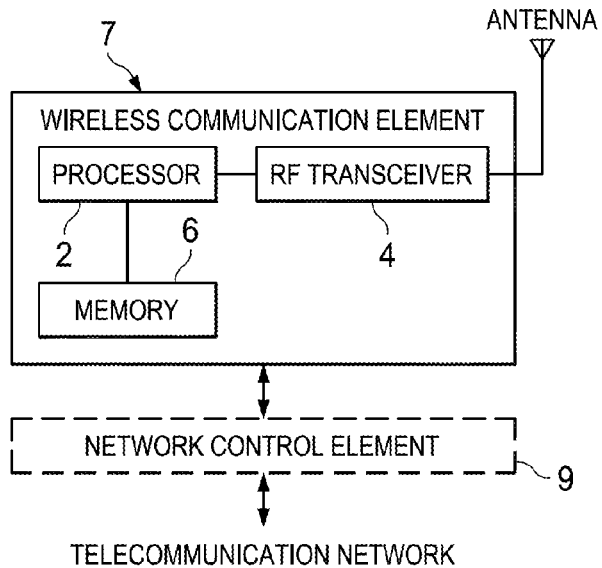
FIG. 3 illustrates a block diagram of an apparatus according to an advantageous embodiment of the present invention.

FIG. 3 illustrates in a simplified block diagram an example communication element of a communication system that provides an environment and structure for application of the principles of the present invention. The communication element 7 may represent, without limitation, an apparatus including a base station BS or a mobile station MS such as a terminal or mobile station. The communication element includes, at least, a processor 2, memory 6 that stores programs and data of a temporary or more permanent nature, an antenna, and at least one radio frequency transceiver 4 coupled to the antenna and the processor for bidirectional wireless communication. Other functions may also be provided, including without limitation circuitry implementing other RF communications standards (multi-band devices) and additional RF transceivers. The communication element may provide point-to-point and/or point-to-multipoint communication services.

The communication element 7, such as a base station in an RF communications network, may be coupled to a network control element 9, such as a network control element of a public switched telecommunication network. The network control element 9 may, in turn, be formed with a processor, memory, and other electronic elements (not shown). The network control element 9 generally provides access to a telecommunication network such as a public switched telecommunication network ("PSTN"). Access may be provided using fiber optic, coaxial, twisted pair, microwave communication, or similar communication links coupled to an appropriate link-terminating element. A communication element 7 formed as a mobile station is generally a self-contained device intended to be carried by an end user; however in areas where wired services are not available, the mobile station may be permanently installed at a fixed location as well.

The processor 2 in the communication element 7, which may be implemented with one or a plurality of processing devices, performs functions associated with its operation including, without limitation, encoding and decoding of individual bits forming a communication message, formatting of information, and overall control of the communication element, including processes related to management of resources. Exemplary functions related to management of resources include, without limitation, hardware installation, traffic management, performance data analysis, tracking of end users and mobile stations, configuration management, end user administration, management of the mobile station, management of tariffs, subscriptions, and billing, and the like. The execution of all or portions of particular functions or processes related to management of resources may be performed in equipment separate from and/or coupled to the communication element, with the results of such functions or processes communicated for execution to the communication element. The processor 2 of the communication element may be of any type suitable to the local application environment, and may include one or more of general-purpose computers, special-purpose computers, microprocessors, digital signal processors ("DSPs"), and processors based on multi-core processor architectures, as non-limiting examples.

The transceiver 4 of the communication element 7 modulates information onto a carrier waveform for transmission by the communication element via the antenna to another communication element. The transceiver 4 demodulates information received via the antenna for further processing by other communication elements.

The memory 6 of the communication element 7, as introduced above, may be of any type suitable to the local application environment, and may be implemented using any suitable volatile or non-volatile data storage technology, such as a semiconductor-based memory device, a magnetic memory device and system, an optical memory device and system, fixed memory, and removable memory. The programs stored in the memory 6 may include program instructions that, when executed by an associated processor 2, enable the communication element 7 to perform tasks as described herein. Exemplary embodiments of the system, subsystems, and modules as described herein may be implemented, at least in part, by computer software executable by processors of, for instance, the mobile station and the base station, or by hardware, or by combinations thereof. Other programming may be used such as firmware and/or state machines. As will become more apparent, systems, subsystems and modules may be embodied in the communication element 7 as illustrated and described above.

In the SDD, two types of carriers are contemplated: fully configured carrier and partially configured carriers. A fully configured carrier has all of the control channel information needed to support communication with one, or several, subscriber stations. The configuration includes synchronization, broadcast, multicast and unicast control signaling parameters. Parameters and information regarding multiple carrier operations, and the other carriers, may be included in the control channels.

In one deployment described in the SDD, all carriers in the air interface system are fully configured to operate standalone. Each carrier in this environment may support some subscriber stations as the primary carrier.

In this scenario, a mobile station or subscriber station entering the network on power up or otherwise entering the range of the network can detect any carrier, and the information required to complete the network entry is available on that carrier, so no latency to enter the network is present.

In a second deployment scenario described by the SDD, the system utilizes some primary carriers that are fully configured, and additional partially configured secondary or supplemental carriers optimized to provide additional data bandwidth. These supplemental carriers may be used only in conjunction with a primary carrier. These partially configured carriers cannot operate stand alone as a primary carrier for a subscriber station.

The SDD does not provide, for the second deployment scenario, the specifics of the network entry procedure for the MS to locate the fully configured carrier. Since during the network entry, the MS does not know which carrier is fully configured, the MS will search the carrier preambles to identify a fully configured carrier by establishing synchronization with the BS.

Figure 4:
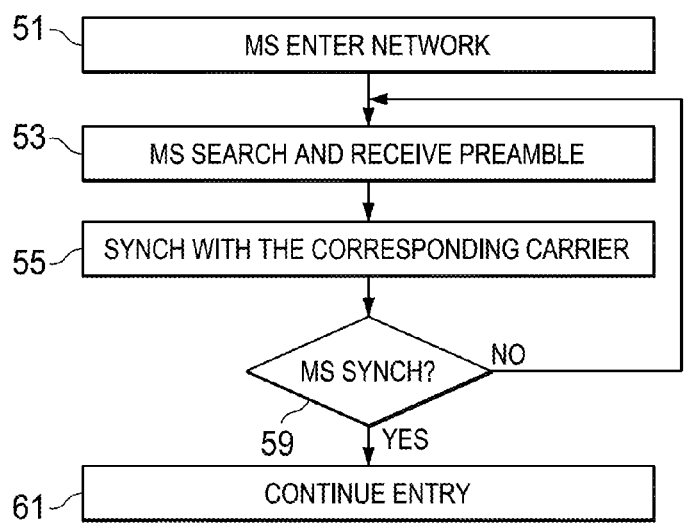
FIG. 4 illustrates in a flow diagram steps a typical mobile station will perform to enter a network in a prior art method.

FIG. 4 depicts in a flow diagram a known method for the steps a MS will perform to establish a connection with a fully configured carrier. In state 51, the MS enters the network. This could be by initially powering up or because the MS first comes within range of the base station.

In state 53, the mobile station initially detects a carrier and receives a preamble. Carriers in the SDD are described as lying within frequencies less than 6 GHz and being spaced apart by a spacing frequency which is an implementation parameter that may vary, but is used to increase the robustness of the system by providing spacing between carriers. Other standard interfaces may use different frequencies and future 802.16m standards may vary the frequencies used. The choice of carrier and system frequencies in the embodiments described herein is not limited to the present frequencies used or any particular example.

In state 55, the mobile station MS will attempt to synchronize with the carrier using the received preamble. In FIG. 4, the known approach, the MS does not know whether the carrier is fully or partially configured and so must take further steps to determine whether a fully configured carrier has been detected.

In state 59, the MS determines whether it has synchronized with the carrier detected. If the synchronization is successful, the MS will then continue to enter the network performing additional steps as described below. If the synchronization is unsuccessful, the state diagram transitions to state 53 and the MS changes the carrier frequency. The MS then detects another carrier and continues searching for another carrier.

The steps of FIG. 4 illustrate the latency (time required) for network entry where there is no distinguishing parameter to identify a fully configured carrier. The latency can be quite significant and will occur each time a MS powers up. A more efficient method for performing the network entry is thus needed, with reduced latency in the network entry process.

Figure 5:
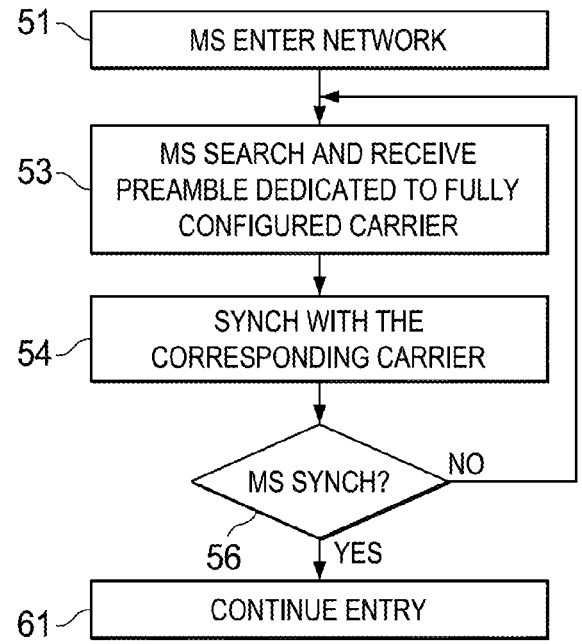
FIG. 5 illustrates in a flow diagram a first embodiment of the present invention, showing steps a mobile station may advantageously perform to use the embodiments to enter a network.

In FIG. 5, a flow diagram illustrates the method steps of a first embodiment of the present invention. In FIG. 5, the preambles of fully configured carriers and the preambles of partially configured carriers are grouped or separately designed to enable a MS receiving the preamble to determine if the carrier is fully configured, without the need for attempting to synchronize to the base station. In this case, the MS just searches preambles of fully configured carriers during network entry. Thus, once the preamble is identified as a preamble of a fully configured carrier, the MS knows that it should be able to synchronize to the base station BS on this carrier, and thus the search may be rapidly performed. There is no need for the MS using this embodiment to search or receive preambles of partially configured carriers during network entry, reducing the search space the MS has to cover to locate the fully configured carrier, and thereby greatly reducing the latency of the network entry process.

In FIG. 5, the flow diagram again begins in state 51, when the MS enters the network. The MS then searches and detects a preamble dedicated to a fully configured carrier in state 53. The MS can only synchronize to a preamble for fully configured carriers. If the MS cannot detect a valid preamble for a fully configured carrier in states 54 and 56, the MS then returns to state 53 to detect another carrier. If the MS detects a valid preamble for a fully configured carrier as determined in states 54 and 56, the MS transitions to state 61, and continues the process of network entry.

The embodiment of FIG. 5 requires that the preambles used by the base stations and the mobile stations in the system be grouped or modified so that the MS can receive a preamble which is transmitted by fully configured carriers. This embodiment provides a very efficient method for reducing the latency of the network entry process, but does require a change to the preambles between fully configured and partially configured carriers.

One non-limiting implementation example of the embodiment of FIG. 5 can be that all the partially configured carriers are transmitting the same preamble. In this way, the design is simple and efficient.

Figure 6:
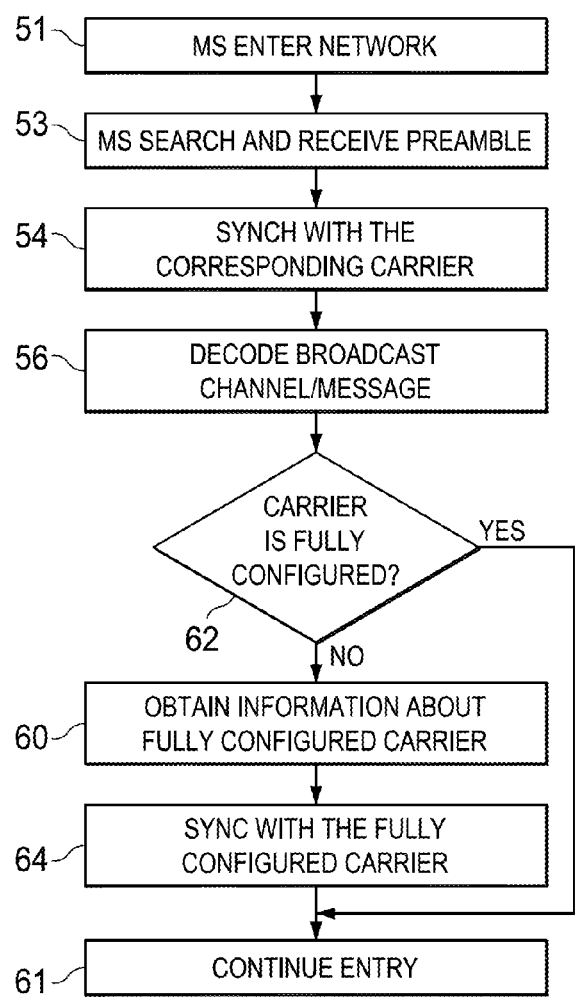
FIG. 6 illustrates in a flow diagram a second alternative embodiment of the present invention, showing alternative steps a mobile station may advantageously perform to use the embodiment to enter a network.

In FIG. 6, an alternative method embodiment is depicted in a flow diagram. In FIG. 6, the method begins again with a MS in the network entry state 51. The flow diagram then transitions to state 53 where the MS detects a carrier in the environment by performing a search and receiving a preamble. The flow diagram then transitions to a state 54 where the MS synchronizes to the carrier using the preamble. In state 56, the MS then decodes the message broadcast by the BS using the information in the preamble. In state 62, the MS determines from the information in the preamble and/or other control information provided by the BS whether the detected carrier is a fully configured carrier. If it is not, in this alternative embodiment, the partially configured carrier control information in the decoded message provides the frequency of the associated fully configured carrier(s), which is received by the MS in state 60. In state 64, the MS can now change the receiver frequency to the correct carrier frequency for the fully configured carrier. The MS then continues the network entry process in state 61, as before. Thus the latency of the network entry process is greatly reduced, because the MS can detect any carrier and if it is not a fully configured carrier, the information needed to find the fully configured carrier is available to the MS from the received control information.

In yet another method embodiment of the present invention, fully configured carriers and partially configured carriers are distinguished by providing a different carrier raster for partially configured carriers. In this manner, a MS can detect a fully configured carrier without taking time to receive a preamble from any partially configured carriers. In this manner, the time needed to locate a fully configured carrier is again reduced.

Figure 7:
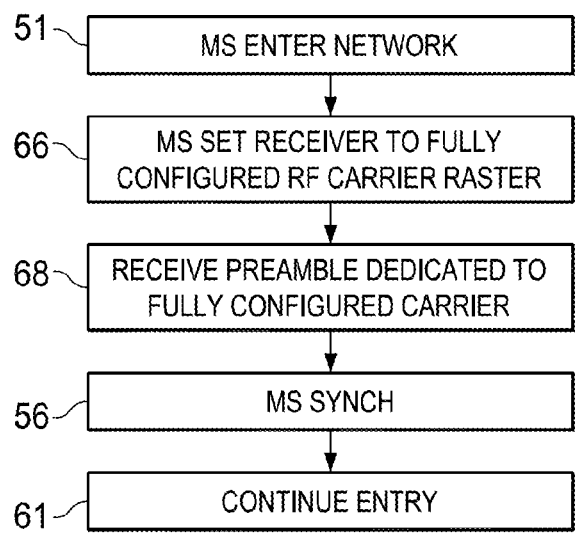
FIG. 7 illustrates in a flow diagram a third alternative embodiment of the present invention, showing additional alternative steps a mobile station may advantageously perform to use the embodiment to enter a network.

FIG. 7 depicts in a flow diagram the steps the MS may perform in this method. In FIG. 7, the flow diagram again begins in state 51 by entering the network. The MS in this alternative embodiment in state 66 sets the receiver to receive carriers having the raster associated with the fully configured carriers. The state diagram then transitions to state 68, where the MS receives the fully configured carrier preamble. In state 56, the MS again performs a synchronization step to establish a connection with the base station BS using the fully configured carrier. In state 61 the mobile station then continues the network entry process.

The MS may be implemented as one or more integrated circuits, and may be integrated into a single ASIC device, or the MS may be implemented using off the shelf components and commodity memory devices, for example. The MS may be implemented in hardware, software, or a combination of the two, such as a programmable processor. The depicted block diagrams above are exemplary, and not the only arrangements contemplated, the blocks may be combined or re-partitioned and these alternative embodiments are contemplated as alternative embodiments of the invention and fall within the appended claims.

The MS may be implemented as a programmable device including a processor and memory for storing instructions. The method embodiments of FIGS. 5, 6 and 7 may therefore be embodied in software that, when executed by a programmable processor, perform the steps described above. The software may be stored in a computer readable medium such as a floppy disk, USB drive, and hard drive, optical storage medium such as a CD or DVD, and other machine readable storage.

According to an illustrative embodiment, an apparatus such as a MS (typically a mobile phone or cell phone) is provided that may implement a user function. An efficient method is provided to perform network entry of the MS into a multiple carrier RF system by providing a characteristic that distinguishes a carrier that is fully configured to support communications over an air interface from partially configured carriers that are not so configured. In a first embodiment, the preambles of fully configured carriers are grouped together and the preambles of the partially configured carriers are grouped together so that when a MS just searches a preamble for fully configured carriers, the numbers of preamble sequences used for fully configured carriers and partially configured carriers are not necessarily the same. The preamble group defined for partially configured carriers can be made up of only one preamble.

According to another illustrative embodiment, an apparatus such as a MS is provided that may include a receiver for receiving, from a transmitter, a preamble. The MS searches and detects a carrier and receives the preamble. After the MS receives the preamble, the MS can synchronize to the carrier and receive a broadcast message that includes information indicating whether the carrier on the received frequency is a fully configured carrier, and if not, further includes information indicating where the associated fully configured carrier is located. The MS can then change its receiver to the fully configured carrier frequency without searching and detecting further preambles.

According to yet another illustrative embodiment, an apparatus such as a MS is provided that includes a receiver for receiving, from a transmitter, fully configured carriers having a specified carrier raster that is different from a raster used for partially configured carriers. On detecting a carrier with the predetermined raster, the MS has identified a fully configured carrier and may synchronize to the carrier and complete the network entry process.

According to another illustrative embodiment, a software program is provided on a computer readable medium that, when executed by a programmable MS, performs the method of providing a MS network entry process that distinguished a fully configured carrier from partially configured carriers received over an RF interface, identifies a fully configured carrier, synchronizes to the fully configured carrier and communicates with a base station over the fully configured carrier, and completes the network entry process.

An integrated circuit embodiment is provided including an RF transceiver, a processor, a memory, and a software program stored within the memory. The program is executed by the processor to perform the network entry for a MS by distinguishing a fully configured carrier received over an RF interface from partially configured carriers received over the RF interface, detects a fully configured carrier received at the RF interface, synchronizes to a BS using the fully configured carrier, and competes a network entry process for the MS.

In another illustrative embodiment, a computer readable medium may be provided with instructions that cause a programmable processor to perform a MS network entry into a network having a base station transmitting RF signals over fully configured carriers and partially configured carriers, distinguishing fully configured carriers from partially configured carriers, detecting a received fully configured carrier, synchronizing to the base station using the fully configured carrier, and completing the network entry process.

According to another illustrative method embodiment, an apparatus such as a MS is provided that may include a receiver for receiving, from a transmitter, a preamble over an air interface that uses 802.16m standard signaling. The received preamble allows the MS to synchronize with the carrier and receive a message that includes information indicating whether the carrier on the received frequency is a fully configured carrier, and if not, further includes information indicating where the associated fully configured carrier is located. The MS can then change its receiver to the fully configured carrier frequency without detecting and receiving further preambles.

According to an illustrative embodiment, an apparatus such as an 802.16m compliant MS (typically a mobile phone or cell phone) is provided that may implement a user function. An efficient method is provided to perform network entry of the MS into a multiple carrier IEEE 802.16m standard system by providing a characteristic that distinguishes a fully configured carrier that is fully configured to support communications from partially configured carriers that are not so configured.

In a first embodiment, the preambles of fully configured carriers are grouped together and the preambles of the partially configured carriers are grouped together so that a MS just searches the preambles for fully configured carriers.

In yet another embodiment of the present invention, fully configured carriers and partially configured carriers implemented in an 802.16m standard advanced air interface are distinguished by providing a different carrier raster for fully configured carriers. In this manner, a MS can detect a fully configured carrier without taking time to receive a preamble from any partially configured carriers. In this manner, the time needed to locate a fully configured carrier is again reduced.

Although various embodiments of the present invention and its advantages have been described in detail, it should be understood that various changes, substitutions and alterations can be made herein without departing from the spirit and scope of the invention as defined by the eventual claims. For example, many of the processes discussed above can be implemented in different methodologies and replaced by other processes, or a combination thereof, to advantageously coordinate efficient network entry for a mobile station into a radio frequency communications environment using multiple carriers.

Moreover, the scope of the present application is not intended to be limited to the particular embodiments of the process, apparatus, machine, manufacture, composition of matter, means, methods and steps described in the specification. As one of ordinary skill in the art will readily appreciate from the disclosure of the present invention, processes, apparatuses, machines, manufacture, compositions of matter, means, methods, or steps, presently existing or later to be developed, that perform substantially the same function or achieve substantially the same result as the corresponding embodiments described herein may be utilized according to the present invention. Accordingly, the eventual claims are intended to include within their scope such processes, apparatus, machines, manufacture, compositions of matter, means, methods, or steps.

What is claimed is:

1. A method, comprising:
providing a mobile station (MS) for receiving and sending signals over a radio frequency air interface;
receiving at least one preamble signal from a carrier over the radio frequency air interface;
determining whether the received at least one preamble signal corresponds to a carrier that is fully configured to support MS communications; and
based on the determination, synchronizing with the carrier to communicate radio frequency signals over the air interface;
determining from a received at least one preamble signal that the carrier is not fully configured to support MS communications;
determining from additional information recovered from the received at least one preamble signal how to receive a second preamble from another carrier that is fully configured to support MS communications; and
receiving a second preamble from the fully configured carrier over the air interface.

2. The method of claim 1, wherein determining whether the at least one preamble signal corresponds to a carrier that is fully configured further comprises receiving a predetermined characteristic in the preamble that indicates whether the corresponding carrier is in a group of fully configured carriers.

3. The method of claim 1, wherein receiving at least one preamble signal further comprises:
receiving the preamble signal;
recovering information from the preamble signal for receiving a broadcast message from the corresponding carrier;
receiving the broadcast message including information indicating whether the carrier is a fully configured carrier configured to support MS communication; and
if the carrier is a fully configured carrier, completing a network entry process using the carrier.

4. The method of claim 3, and further comprising:
if the carrier is not a fully configured carrier, recovering information from the received broadcast message indicating the location of a fully configured carrier; and
receiving a second preamble signal from the fully configured carrier.

5. The method of claim 1, wherein receiving the at least one preamble signal further comprises:
using a predetermined carrier raster known to be allocated to fully configured carriers, receiving the at least one preamble signal from a fully configured carrier; and
completing entry into the network using the fully configured carrier.

6. An apparatus comprising:
radio frequency mobile station (MS) comprising a radio frequency transceiver for receiving and sending radio frequency signals over an air interface;
circuitry for receiving preamble signals from carriers over the air interface;
circuitry for determining whether a received preamble signal corresponds to a carrier that is fully configured to support MS communications over the air interface; and
circuitry for recovering additional information from the received preamble to locate additional carriers
wherein the circuitry for determining further comprises:
circuitry for recovering a broadcast message using information from the preamble signal;
and circuitry for determining whether the broadcast message was received from a carrier fully configured to support MS communications over the air interface.

7. The apparatus of claim 6, and further comprising:
circuitry for recovering information from the broadcast message indicating that the broadcast message corresponds to a carrier not fully configured to support MS communications; and
circuitry for determining from the broadcast message the location of a second carrier that is fully configured to support MS communications.

8. The apparatus of claim 6, wherein the circuitry for receiving preamble signals further comprises circuitry for receiving transmissions from carriers using a raster that is assigned to carriers fully configured to support MS communications over the air interface.

9. The apparatus of claim 6, and further comprising circuitry for completing entry into a network by communication with a carrier fully configured to support MS communications over the air interface.

10. The apparatus of claim 6, wherein the air interface has multiple carriers within a reception area of the radio frequency transceiver.

11. A system comprising:
a plurality of radio frequency carriers operating over an air interface, at least some of the radio frequency carriers fully configured to support mobile station (MS) communications;
one or more MS devices, each comprising:
a radio frequency transceiver for receiving and sending radio signals over the air interface;
circuitry within the radio frequency transceiver for receiving preambles from carriers over the air interface;
circuitry coupled to the radio frequency transceiver for determining whether a received preamble corresponds to a carrier that is fully configured to support user equipment communications over the air interface; and
circuitry coupled to the radio frequency transceiver for recovering additional information from the received preamble to locate additional carriers;
wherein radio frequency carriers fully configured to support MS communications are grouped together and transmit a predetermined preamble corresponding to a fully configured carrier and the remaining carriers are grouped together and transmit a preamble that includes information indicating where a fully configured carrier preamble may be received.

12. The system of claim 11, wherein the radio frequency carriers fully configured to MS communications are grouped together and transmit a carrier raster corresponding to a fully configured carrier.

13. The system of claim 12, wherein the MS device further comprises: circuitry for receiving transmissions from carriers using a raster that is assigned to carriers fully configured to support MS communications over the air interface.

14. The system of claim 11, wherein the radio frequency carriers fully configured to support MS communications are grouped together and transmit a broadcast message corresponding to a fully configured carrier and the remaining carriers are grouped together and transmit a broadcast message that includes information indicating where a fully configured carrier preamble may be received.

15. The system of claim 14, wherein the MS device further comprises:
circuitry for recovering a broadcast message using information received in the preamble; and
circuitry for determining whether the broadcast message was received from a carrier fully configured to support user equipment communications over the air interface.

16. A non-transitory computer readable storage medium containing stored instructions that, when executed by a programmable receiver in a mobile station (MS) device for transceiving radio frequency signals over an air interface, cause the MS to perform the steps of:
receiving at least one preamble signal from a carrier over the air interface;
determining whether the preamble is from a carrier that is fully configured to support MS communications;
based on the determination, synchronizing to the carrier to communicate over the air interface; and
determining from a received at least one preamble signal that the carrier is not fully configured to support MS communications;
determining from additional information recovered from the received at least one preamble signal how to receive a second preamble from another carrier that is fully configured to support MS communications; and
receiving a second preamble from the fully configured carrier over the air interface.

17. The non-transitory computer readable storage medium of claim 16 and containing further instructions that, when executed by the programmable receiver in an MS device for transceiving radio frequency signals over an air interface, cause the MS to perform the steps of:
receiving a preamble;
using information recovered from the preamble, receiving a broadcast message from a carrier over the air interface; and
determining whether the carrier is a fully configured carrier configured to support MS equipment communications.

18. A method, comprising:
providing a mobile station (MS) for receiving and sending signals over a radio frequency air interface;
receiving at least one preamble signal from a carrier over the radio frequency air interface;
determining whether the received at least one preamble signal corresponds to a carrier that is fully configured to support MS communications; and
based on the determination, synchronizing with the carrier to communicate radio frequency signals over the air interface;
wherein determining whether the at least one preamble signal corresponds to a carrier that is fully configured further comprises receiving a predetermined characteristic in the preamble that indicates whether the corresponding carrier is in a group of fully configured carriers.

19. A method, comprising:
providing a mobile station (MS) for receiving and sending signals over a radio frequency air interface;
receiving at least one preamble signal from a carrier over the radio frequency air interface;
determining whether the received at least one preamble signal corresponds to a carrier that is fully configured to support MS communications; and
based on the determination, synchronizing with the carrier to communicate radio frequency signals over the air interface;
wherein receiving at least one preamble signal further comprises:
receiving the preamble signal;
recovering information from the preamble signal for receiving a broadcast message from the corresponding carrier;
receiving the broadcast message including information indicating whether the carrier is a fully configured carrier configured to support MS communication; and
if the carrier is a fully configured carrier, completing a network entry process using the carrier.

20. A method, comprising:
providing a mobile station (MS) for receiving and sending signals over a radio frequency air interface;
receiving at least one preamble signal from a carrier over the radio frequency air interface;
determining whether the received at least one preamble signal corresponds to a carrier that is fully configured to support MS communications; and
based on the determination, synchronizing with the carrier to communicate radio frequency signals over the air interface;
wherein receiving the at least one preamble signal further comprises:

using a predetermined carrier raster known to be allocated to fully configured carriers, receiving the at least one preamble signal from a fully configured carrier; and completing entry into the network using the fully configured carrier.

21. An apparatus comprising:

radio frequency mobile station (MS) comprising a radio frequency transceiver for receiving and sending radio frequency signals over an air interface;

circuitry for receiving preamble signals from carriers over the air interface;

circuitry for determining whether a received preamble signal corresponds to a carrier that is fully configured to support MS communications over the air interface; and circuitry for recovering additional information from the received preamble to locate additional carriers;

wherein the circuitry for receiving preamble signals further comprises circuitry for receiving transmissions from carriers using a raster that is assigned to carriers fully configured to support MS communications over the air interface.

22. A system comprising:

a plurality of radio frequency carriers operating over an air interface, at least some of the radio frequency carriers fully configured to support mobile station (MS) communications;

one or more MS devices, each comprising:
　a radio frequency transceiver for receiving and sending radio signals over the air interface;
　circuitry within the radio frequency transceiver for receiving preambles from carriers over the air interface;
　circuitry coupled to the radio frequency transceiver for determining whether a received preamble corresponds to a carrier that is fully configured to support user equipment communications over the air interface; and
　circuitry coupled to the radio frequency transceiver for recovering additional information from the received preamble to locate additional carriers;

wherein the radio frequency carriers fully configured to support MS communications are grouped together and transmit a broadcast message corresponding to a fully configured carrier and the remaining carriers are grouped together and transmit a broadcast message that includes information indicating where a fully configured carrier preamble may be received.

23. A system comprising:

a plurality of radio frequency carriers operating over an air interface, at least some of the radio frequency carriers fully configured to support mobile station (MS) communications;

one or more MS devices, each comprising:
　a radio frequency transceiver for receiving and sending radio signals over the air interface;
　circuitry within the radio frequency transceiver for receiving preambles from carriers over the air interface;
　circuitry coupled to the radio frequency transceiver for determining whether a received preamble corresponds to a carrier that is fully configured to support user equipment communications over the air interface; and
　circuitry coupled to the radio frequency transceiver for recovering additional information from the received preamble to locate additional carriers;

wherein the MS device further comprises:
　circuitry for recovering a broadcast message using information received in the preamble; and
　circuitry for determining whether the broadcast message was received from a carrier fully configured to support user equipment communications over the air interface.

\* \* \* \* \*